US012667979B1

(12) United States Patent
Marchese et al.

(10) Patent No.: US 12,667,979 B1
(45) Date of Patent: Jun. 30, 2026

(54) ROBOTIC MANIPULATORS FOR COLLABORATIVE AND INDEPENDENT TASKS

(71) Applicant: Amazon Technologies, Inc., Seattle, WA (US)

(72) Inventors: Andrew D Marchese, Concord, MA (US); Yuri Anatoly Ivanov, Lexington, MA (US); Vincent Kerstholt, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 27 days.

(21) Appl. No.: 18/638,210

(22) Filed: Apr. 17, 2024

(51) Int. Cl.
      B25J 15/00          (2006.01)
      B25J 9/16            (2006.01)
(52) U.S. Cl.
      CPC ......... B25J 15/0066 (2013.01); B25J 9/1661 (2013.01)
(58) Field of Classification Search
      CPC .......................... B25J 15/0066; B25J 9/1661
      USPC ........................................................ 700/245
      See application file for complete search history.

(56) References Cited

U.S. PATENT DOCUMENTS

| | | | | |
|---|---|---|---|---|
| 2019/0358810 A1* | 11/2019 | Odhner | ................. | B25J 13/085 |
| 2020/0171650 A1* | 6/2020 | Hallock | ................... | B25J 9/009 |
| 2021/0229281 A1* | 7/2021 | Natarajan | ................ | B25J 9/163 |
| 2022/0093433 A1* | 3/2022 | Huang | .............. | H01L 21/67778 |
| 2022/0241975 A1* | 8/2022 | Tan | ........................ | B25J 9/1661 |
| 2023/0097672 A1* | 3/2023 | Saez | .................... | B25J 15/0491 483/58 |
| 2024/0017399 A1* | 1/2024 | Rest | ........................ | B25J 9/0093 |
| 2025/0054792 A1* | 2/2025 | Lee | ................... | H01L 21/67766 |

* cited by examiner

*Primary Examiner* — Kira Nguyen
(74) *Attorney, Agent, or Firm* — Kilpatrick Townsend & Stockton LLP

(57)                    ABSTRACT
Robotic manipulators that can independently or collaboratively perform tasks are described herein. For example, a robotic system can include a set of linear rails, a first robotic manipulator, and a second robotic manipulator. The first robotic manipulator can be mechanically coupled to a first linear rail of the set of linear rails. The first robotic manipulator can move, along the first linear rail, a first object between first locations. The second robotic manipulator can be mechanically coupled to a second linear rail of the set of linear rails. The second robotic manipulator can move, along the second linear rail, a second object between second locations. The second linear rail may be the same or different from the first linear rail. The first robotic manipulator and the second robotic manipulator may collaboratively move, along the first linear rail and the second linear rail, a third object between third locations.

20 Claims, 11 Drawing Sheets

800

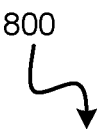

---

802
Grasp, by a first robotic arm mounted to a first linear rail, a first object at a first initial location

↓

804
Move the first robotic arm along the first linear arm from the first initial location to a container positioned between the first linear rail and a second linear rail

↓

806
Release, by the first robotic arm, the first object into the container

↓

808
Grasp, by a second robotic arm mounted to the second linear rail, a second object at a second initial location

↓

810
Move the second robotic arm along the second linear rail from the second initial location to the container

↓

812
Release, by the second robotic arm, the second object into the container

↓

814
Grasp, by the first robotic arm and the second robotic arm, a third object at a third initial location

↓

816
Move, collaboratively, the first robotic arm along the first linear rail to the container and the second robotic arm along the second linear rail to the container

↓

818
Release, by the first robotic arm and the second robotic arm, the third object into the container

900
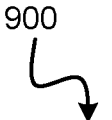
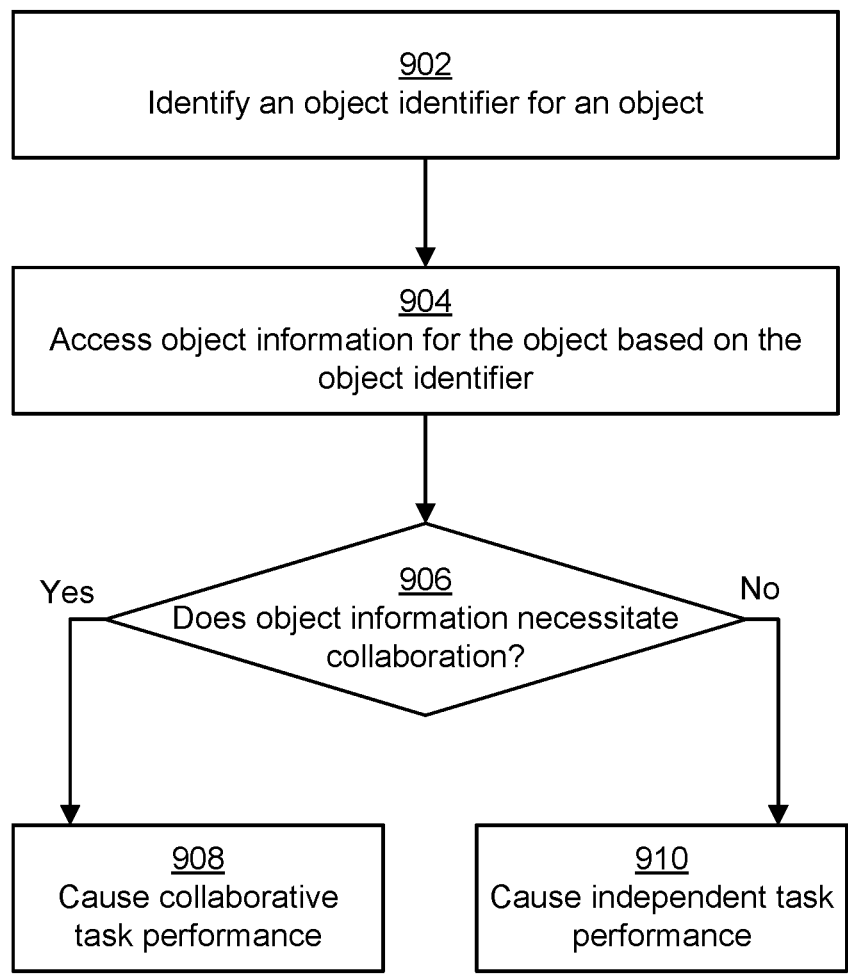
902
Identify an object identifier for an object
904
Access object information for the object based on the object identifier
906
Does object information necessitate collaboration?
Yes
No
908
Cause collaborative task performance
910
Cause independent task performance
FIG. 9

1000

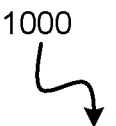

```
┌─────────────────────────────────────────────────┐
│                      1002                        │
│   Generate a sequence of movements for a first   │
│    robotic arm and a second robotic arm to       │
│   collaboratively move a object to a container   │
└─────────────────────────────────────────────────┘
                        │
                        ▼
┌─────────────────────────────────────────────────┐
│                      1004                        │
│  Cause the first robotic arm and the second      │
│  robotic arm to perform a first movement of the  │
│            sequence of movements                 │
└─────────────────────────────────────────────────┘
                        │
                        ▼
┌─────────────────────────────────────────────────┐
│                      1006                        │
│   Receive torque data for the first robotic arm  │
│           and the second robotic arm             │
└─────────────────────────────────────────────────┘
                        │
                        ▼
┌─────────────────────────────────────────────────┐
│                      1008                        │
│   Determine that the first movement has been     │
│   successfully performed based on the torque     │
│                     data                         │
└─────────────────────────────────────────────────┘
                        │
                        ▼
┌─────────────────────────────────────────────────┐
│                      1010                        │
│  Cause the first robotic arm and the second      │
│  robotic arm to perform a second movement of the │
│  sequence of movements in response to            │
│  determining that the first movement has been    │
│             successfully performed               │
└─────────────────────────────────────────────────┘
```

FIG. 10

ROBOTIC MANIPULATORS FOR COLLABORATIVE AND INDEPENDENT TASKS

BACKGROUND

Many modern-day industries are relying more and more on robotic manipulators. Such robotic manipulators may function to increase repeatability of tasks, increase efficiency of production lines, and bring other benefits to their operators. Conventionally, robotic manipulator manufacturers, especially those that develop robotic arms, may offer fixed sizes of robotic arms, leaving little room for customization. This can result in an operator having to pick an oversized, overpowered, and/or otherwise suboptimal robotic arm to perform certain tasks.

BRIEF DESCRIPTION OF THE DRAWINGS

Various embodiments in accordance with the present disclosure will be described with reference to the drawings, in which:

FIG. 8 illustrates an example flow diagram of a process for robotic arms performing independent tasks and collaborative tasks, according to a particular embodiment;

FIG. 9 illustrates an example flow diagram of a process for determining a collaborative task or an independent task for robotic arms, according to a particular embodiment;

FIG. 10 illustrates an example flow diagram of a process for causing robotic arms to perform a sequence of movements, according to a particular embodiment.

DETAILED DESCRIPTION

Figure 1:
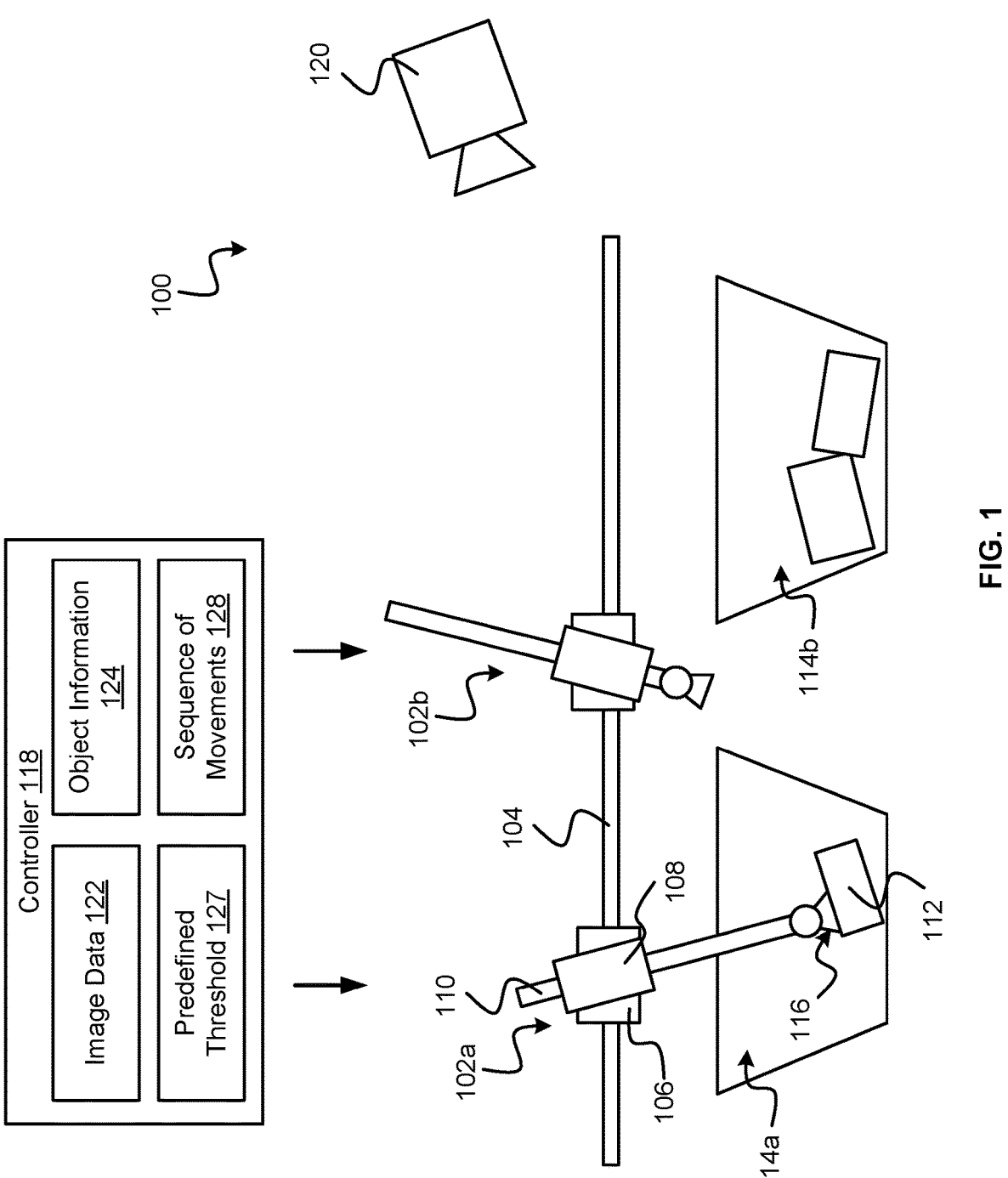
FIG. 1 illustrates an example robot system with two robotic manipulators on a linear rail performing tasks, according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, robotic manipulators that can perform independent tasks and collaborative tasks. An example robotic system can include a first robotic manipulator and a second robotic manipulator. Each robotic manipulator can be mounted on a linear rail (e.g., the same linear rail or separate linear rails). The robotic manipulators can move along the linear rail and perform tasks, such as handling, grasping, or moving objects between locations. At a first time, the first robotic manipulator may independently move a first object between first locations while the second robotic manipulator independently moves a second object between second locations. At a second time, the first robotic manipulator can collaboratively move a third object between third locations with the second robotic manipulator. For example, both the first robotic manipulator and the second robotic manipulator can grasp and move the third object at the same time. The first robotic manipulator and the second robotic manipulator may collaboratively handle the third object because the third object may be heavier, larger, or more defect-prone than the first object or the second object.

To illustrate, consider an example of a fulfillment center. Robotic arms with end effectors may perform specialized tasks, such as picking up an object (e.g., a box, a package, or any other type of item) from a conveyer and stowing the object in a container (e.g., a bin, a tote, etc.) associated with an end destination for the object. The specialized task may be dynamic and variable. For example, there may be multiple possible start positions and end positions for different objects. The robotic arms may move along linear rails to reach the start positions and end positions. The specialized tasks may also involve continuously variable payloads (e.g., differing sizes or weights of the objects that are manipulated by the robotic arms). In some examples, there can be a relatively large range of sizes or weights of the objects that are manipulated by the robotic arms (e.g., up to 50 lb.), but a majority (e.g., 90%) of the objects may be relatively small or lightweight (e.g., less than 2 lb.). Thus, for objects with a size or weight below a threshold amount, a single robotic arm can independently pick and stow such objects.

In an example, the robotic arms may be relatively light weight with relatively few degrees of freedom of movement (e.g., four). For example, the robotic arms may have a weight of 50 lbs. or less. In some examples, the robotic arms may have a weight of 5 lbs. or less. For objects that have a size or weight that is above the threshold amount, are defect-prone, or have an irregular shape, it may be difficult or inefficient to use a single robotic arm to move such objects. Instead, two or more robotic arms can collaboratively handle, pick, move, and stow such objects. For example, the end effectors of the robotic arms may include suction tools that can use suction force to couple to a large box. The two or more robotic arms can work together by pushing or suctioning the box to move the bx into a position that can allow each of the robotic arms to suction to the box. Once the box is grasped by the two or more robotic arms, each of the two or more robotic arms can move along the linear rails to a container (e.g., end destination). At the container, the two or more robotic arms can release the box into the container. Thus, the robotic system can dynamically switch between robotic arms performing tasks independently or in collaboration.

Embodiments of the present disclosure provide several technological advantages over conventional robotic manipulator designs. Typically, robotic manipulators may be designed to handle a long-tailed distribution of objects, which includes objects with a wide range of weights or sizes, such as objects weighing up to 50 lb. Although the majority of such objects may fall within a narrow range of weight (e.g., 90% weighing less than 2 lb.), typical robotic manipulators are designed to handle the heaviest objects in the distribution. This may require a relatively large robotic manipulator that may weigh up to 500 lb. Thus, there may be a significant inertial mismatch between the robotic manipulator and the majority of the objects that are handled by the robotic manipulator. Often, footprint, throughput, safety, and other considerations for robotic stations may scale poorly with manipulator size and weight.

In contrast, embodiments described herein involve a manipulation architecture that uses multiple smaller manipulators. For example, each of the smaller robotic manipulators described herein may weigh 50 lb. or less. In a majority of examples (e.g., 90% of the time), these robotic manipulators may handle relatively small objects (e.g., weighing less than 2 lb.) in parallel. The remainder can be handled via two or more robotic manipulators collaborating to handle large, heavy, or defect-prone material (e.g., objects weighing more than 2 lb.). As the robotic manipulators can work in parallel the majority of the time, throughput of object handling can be significantly increased. Further, such robotic manipulators may have a smaller footprint, use less power and may have a simpler construction with fewer degrees of freedom (e.g., four or less) of movement compared to conventional robotic manipulators. In some examples, throughput can have an increase of between 1.5 and four times relative to typical single-arm robotic manipulator architecture. Because of their smaller size and simpler design, the robotic manipulators designed herein may also have flexibility to manipulate objects (e.g., by repositioning or reorienting objects) without damage. This can include non-prehensile manipulation and mechanical grasps by the robotic manipulators.

In the interest of clarity of explanation, embodiments described herein in connection with an inventory system, inventory items (e.g., items associated with an inventory), and manipulations related to an inventory. However, the embodiments are not limited as such. Instead, the embodiments may similarly apply to any objects, whether inventoried or not, and to any system, whether related to inventorying objects or not. For example, the embodiments may similarly apply to a manufacturing system, supply chain distribution center, airport luggage system, or other systems using robot stations to perform various automated, and, in some instances, autonomous operations.

FIG. 1 illustrates an example robotic system 100 with a first robotic manipulator 102a and a second robotic manipulator 102b on a linear rail 104 performing tasks, according to a particular embodiment. Each of the robotic manipulators 102a-b can include a linear actuator 106 that can move the robotic manipulators 102a-b along the linear rail 104 (e.g., a first degree of freedom of movement). Each of the robotic manipulators 102a-b can also include one or more joints 108 that can move a robotic arm 110 in other degrees of freedom of movement to perform the tasks. For example, the tasks can involve moving objects 112 from a source location to destination location, such as from a first container 114a to a second container 114b. In other examples, the source location may be a conveyer. The robot arm 110 can include a suction tool 116 or any other suitable end effector that can grasp the object 112.

The tasks may be performed independently (e.g., by a single robotic manipulator) or collaboratively (e.g., by both robotic manipulators 102a-b working together). A controller 118 can control the movements of the robotic manipulators 102a-b (e.g., by controlling the linear actuator 106 and/or the joints 108) to perform the tasks. The robotic system 100 can further include an optical sensor 120 (e.g., a camera or a scanner) that can detect image data 122. The optical sensor 120 can transmit the image data 122 to the controller 118. The controller 118 can use the image data 122 to identify the objects 112 in the robotic system 100 that are to be moved. For example, image data 122 may depict a barcode or other such identifier scanned by the optical sensor 120. The controller 118 may identify the object 112 based on the barcode. In other examples, the controller 118 can use scene understanding or object recognition to identify the object 112. Once the object 112 has been identified, the controller 118 can access object information 124 for the object 112, such as dimensions, a weight, a shape, a label, or any other information associated with the object 112. The controller 118 can determine whether to cause the robotic controllers 102-b to perform tasks independently or collaboratively based on the object information 124.

For example, the controller 118 may determine that a size or a weight of the object 112 is higher than a predefined threshold 127. Example predefined thresholds 127 can be 0.5 lb. or 2 lb. A single robotic manipulator 102 may be capable of handling, grasping, and moving an object 112 with a size or weight that is below the predefined threshold 127. It may be difficult or impossible for a single robotic manipulator 102 to handle, grasp, or move objects 112 with a size or weight above the predefined threshold 127. Thus, the controller 118 may determine that objects 112 with a size or weight above the predefined threshold 127 are to be collaboratively moved by the robotic manipulators 102a-b. If the object 112 has a size or weight below the predefined threshold 127, the controller 118 may determine that the object 112 can be independently moved by a single robotic manipulator (e.g., either of the first robotic manipulator 102a or the second robotic manipulator 102b).

In other examples, other object information 124 may be used by the controller 118 to determine that the object 112 should be collaboratively moved by both robotic manipulators 102a-b. For example, the object information 124 may include a label that may indicate that the object 112 is fragile or defect prone. As collaboratively moving such objects 112 may be more secure than independently moving such objects 112, even if such objects 112 have a size or weight below the predefined threshold 127, the controller 118 may determine a collaborative move based on the label. Or, the object information 124 (e.g., a label) may indicate that the object 112 has an irregular shape. It may be more beneficial to collaboratively move an irregularly shaped object 112 (e.g., to reduce the risk of inadvertently dropping the object 112). The controller 118 can therefore determine a collaborative movement of the object 112 that is irregularly shaped.

The controller 118 may generate a sequence of movements 128 for the robotic manipulators 102a-b to perform to complete the task, whether independent or collaborative. For example, the sequence of movements 128 for a collaborative task can involve causing the first robotic manipulator 102a and the second robotic manipulator 102b to move along the linear rail 104 to the first container 114a. Then, the sequence of movements 128 can involve causing the first robotic manipulator 102a or the second robotic manipulator 102b to handle the object 112 (e.g., move, suction, push, or otherwise interact with the object 112 to push the object 112 into a position that can allow grasping of the object 112). Then, the sequence of movements 128 can involve causing both the first robotic manipulator 102a and the second robotic manipulator 102b can grasp (e.g., via the suction tool 116)

the object 112. The first robotic manipulator 102a and the second robotic manipulator 102b can lift and move the object 112 from the first container 114a to the second container 114b. Finally, the sequence of movements 128 can cause the first robotic manipulator 102a and the second robotic manipulator 102b to release the object 112 into the second container 114b. The sequence of movements 128 for an independently performed task may be similar but may only involve causing a single robotic manipulator to perform movements.

Figure 2:
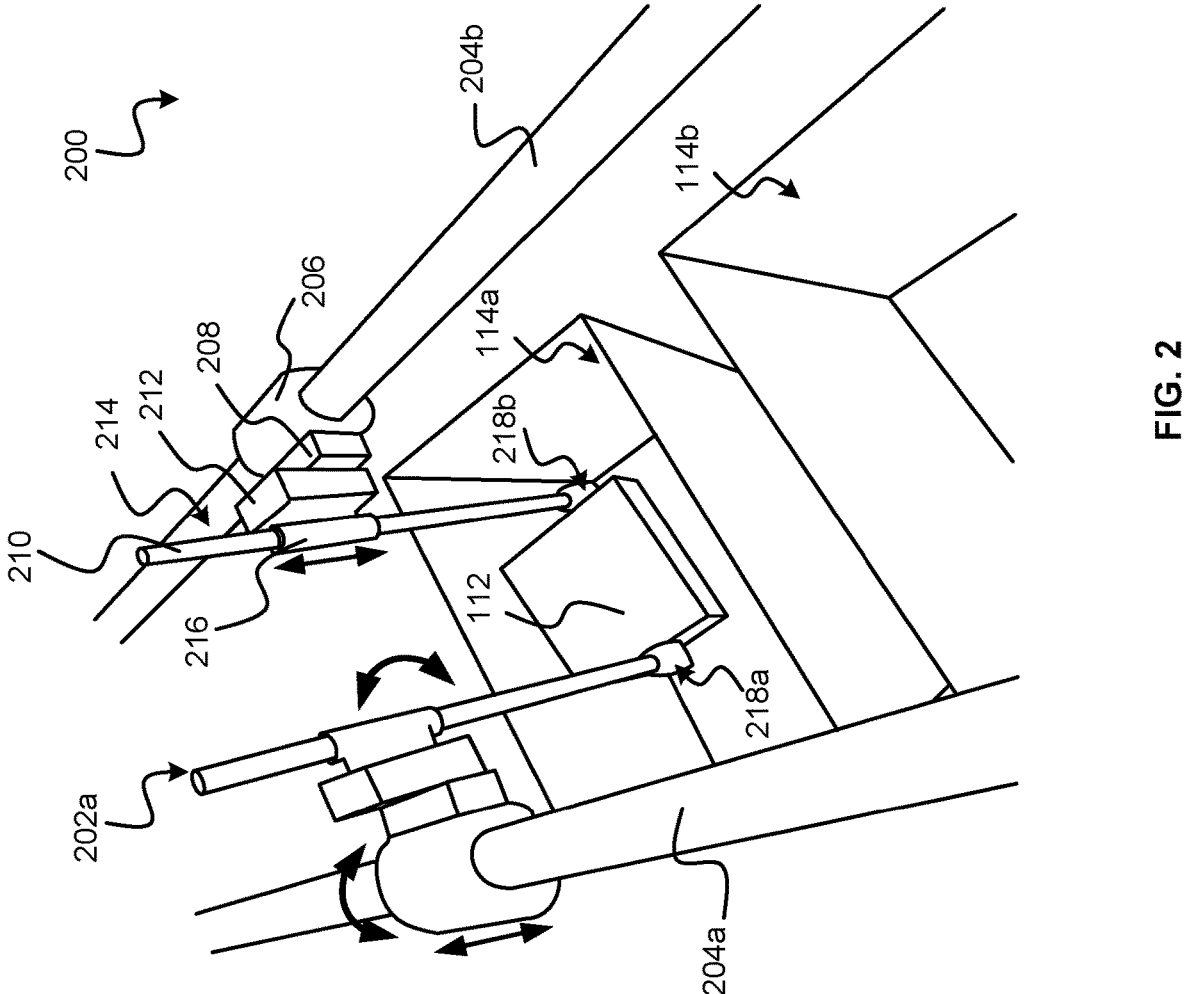
FIG. 2 illustrates another example robot system with two robotic manipulators on separate linear rails performing a collaborative task, according to a particular embodiment.

In some examples, both the robotic manipulators 102a-b may be mounted onto a single linear rail 104. In other examples, each robotic manipulator 102 may be mounted onto a separate linear rail. Such an example is depicted in FIG. 2, which illustrates another example robot system 200 with two robotic manipulators 202a-b on separate linear rails performing a collaborative task, according to a particular embodiment. A first robotic manipulator 202a can be mechanically coupled to a first linear rail 204a and a second robotic manipulator 202b can be mechanically coupled to a second linear rail 204b. The first robotic manipulator 202a and the second robotic manipulator 202b can each perform tasks (e.g., moving an object 112 from a first container 114a to a second container 114b) independently or collaboratively. For example, the first robotic manipulator 202a or the second robotic manipulator 202b may independently move an object 112 (e.g., by grasping the object 112 with a first end effector 218a or a second end effector 218b) from the first container 114a to the second container 114b. Or, the first robotic manipulator 202a can grasp the object 112 (e.g., via the first end effector 218a) and the second robotic manipulator 202b can grasp the object 112 at the same time (e.g., via the second end effector 218b) to move the object 112 from the first container 114a to the second container 114b.

Each of the robotic manipulators 202a-b can include an actuator 206 that can be actuated to move the robotic manipulator 202 along the linear rail 204. This can be a first degree of freedom of movement for the robotic manipulators 202a-b. The robotic manipulators 202a-b can also include a first revolute joint 208, a second revolute joint 212, a linear joint 216, a robotic arm 210, and an end effector 218. The robotic manipulators 202a-b can be coupled to the linear rail 204 at a first end (e.g., via the actuator 206) and can include the end effector 218 at the second end (e.g., of the robotic arm 210). The first revolute joint 208 can allow the robotic manipulators 202a-b to rotate about a first axis, such as the linear rails 204a-b (e.g., a second degree of freedom of movement). The second revolute joint 212 can allow the robotic manipulators 202a-b to rotate about a second axis that is perpendicular to the first axis (e.g., a third degree of freedom of movement). The robotic arm 210 can extend up and down through the linear joint 216 (e.g., a fourth degree of freedom of movement). A controller (e.g. the controller 118 of FIG. 1) can control the actuator 206, the robotic arm 210, the first revolute joint 208, the second revolute joint 212, the linear joint 216, or the end effector 218 to cause the robotic manipulators 202a-b to perform tasks involving manipulating objects 112.

Although two robotic manipulators and one or two linear rails are depicted in FIGS. 1-2, any number of robotic manipulators may be included on any number of linear rails to perform independent or collaborative tasks. Similarly, such robotic manipulators may include any number of actuators, joints, and/or degrees of freedom.

Figure 3:
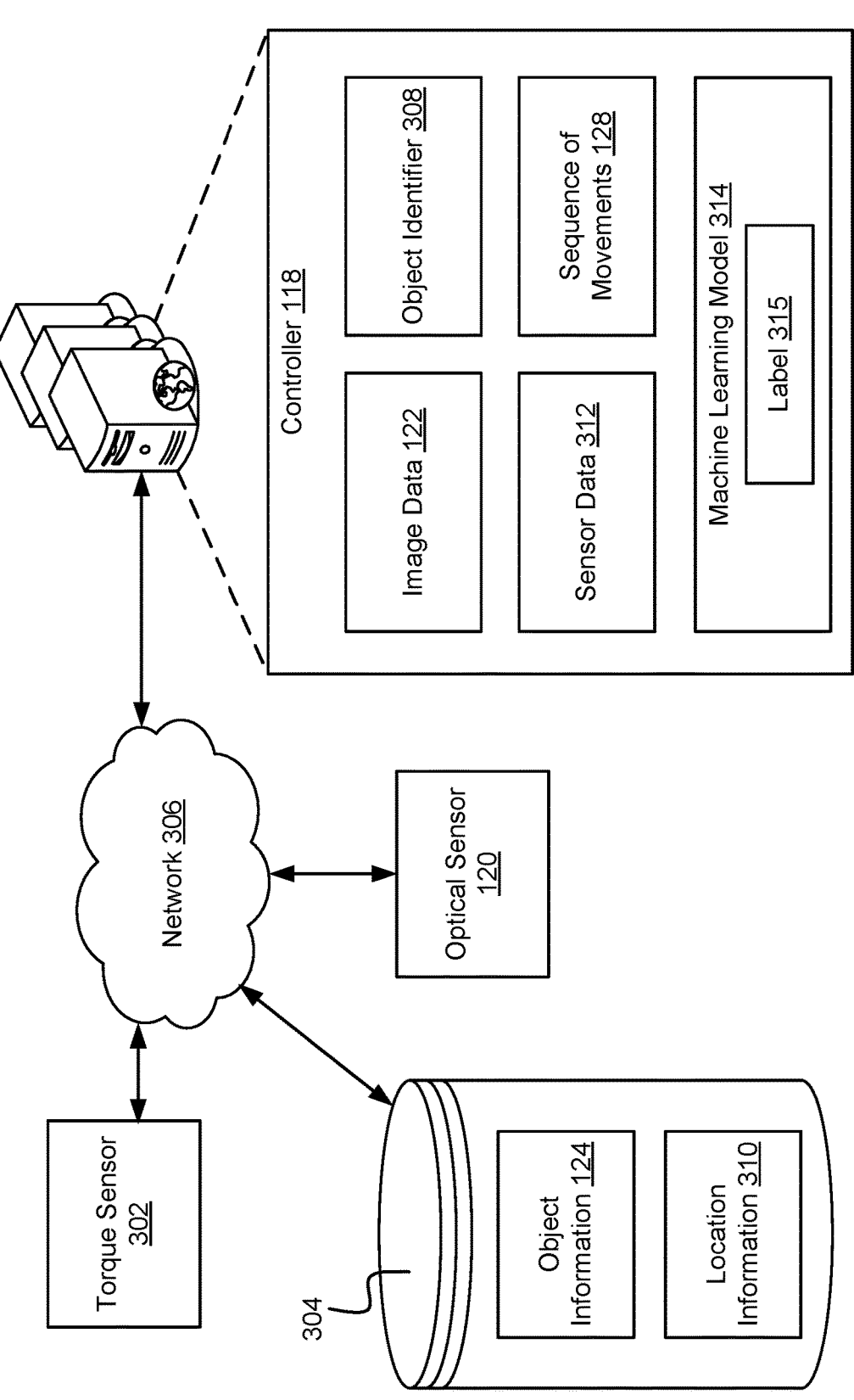
FIG. 3 illustrates a block diagram of an example controller that can cause robotic manipulators to perform independent or collaborative tasks, according to a particular embodiment.

FIG. 3 illustrates a block diagram of an example controller 118 that can cause robotic manipulators to perform independent or collaborative tasks, according to a particular embodiment. The controller 118 can be a server, personal computer, cell phone, laptop computer, or any other suitable type of computing device. The controller 118 can perform task planning (e.g., determining which object to pick next, how to grasp the object, how and where to place the object, planning trajectories for the robotic manipulators, etc.) for the robotic manipulator. The controller 118 can be communicatively coupled with the optical sensor 120, a torque sensor 302, and a data store 304 via a network 306.

The optical sensor 120 can capture image data 122 of robot systems (e.g., including robotic manipulators and objects to be handled by the robotic manipulators) and can send the image data 122 to the controller 118. The torque sensor 302 can be coupled to a component of a robotic manipulator, such as a robotic arm, an actuator, a joint, an end effector, etc. The torque sensor 302 can capture sensor data 312 (e.g., effort data such as torque data or force data, or any other type of sensor data) associated with the component of the robotic manipulator and can transmit the sensor data 312 to the controller 118. In some examples, the torque sensor 302 and the optical sensor 120 can transmit the sensor data 312 and the image data 122 to the controller 118 in real time. In some examples, the controller 118 can receive any other suitable sensor data 312 captured for components of the robotic manipulators, the objects, or any other component of the robot station. For example, the sensor data 312 may include pressure data detected for an end effector of a robotic arm.

The controller 118 can determine an object identifier 308 associated with an object (e.g., the object 112 of FIGS. 1-2) using the image data 122. In some examples, the object identifier 308 may be a barcode or other label 315 depicted in the image data 122. In other examples, the controller 118 may use scene understanding or computer vision techniques to identify the object identifier 308 for the object. For example, the controller 118 may execute one or more machine learning models 314 to identify the object identifier 308.

The controller 118 can use the object identifier 308 to access corresponding object information 124 from the data store 304. The object information 124 can include object dimensions (e.g., length, width, or depth of the object), a weight of the object, object labels 315 (e.g., indicating that the object is fragile, defect prone, or irregularly shaped), or any other suitable information describing the object. The controller 118 can also use the object identifier 308 to access location information 310 for the object that can include a source location and a destination location. The controller 118 can use the object information 124 and the location information 310 to determine whether to cause a robotic manipulator to independently or collaboratively (e.g., with another robotic manipulator) move the object from the source location to the destination location.

For example, the controller 118 may determine a collaborative movement of the object if an object dimension is higher than a predefined threshold (e.g., a foot) or if the object weight is higher than a predefined threshold (e.g., 2 lb.). The controller 118 may also determine a collaborative movement if the object is labeled (e.g., in the object information 124) as being fragile, defect prone, irregularly shaped, etc. In some examples, the controller 118 may determine a collaborative movement of the object if the source location and the destination location are relatively far (e.g., more than a threshold distance apart). If the controller 118 does not determine that a collaborative movement of the object is needed, the controller 118 may determine that a single robotic manipulator will move the object from the source location to the destination location. In some examples, the controller 118 may initially cause a single robotic manipulator to move the object from the source location to the destination location. But, the controller 118 may determine (e.g., based on image data 122 or sensor data 312) that single robotic manipulator has failed at performing the task. For example, a first robotic manipulator may have failed a suction grasp. Upon detecting the task failure, the controller can cause a second robotic manipulator to assist the first robotic manipulator. Thus, an independent task can become a collaborative task.

In some examples, the controller 118 may use the machine learning model 314 to determine whether to cause an independent or collaborative movement of the object. For example, the controller may provide at least one of the image data 122, the sensor data 312, or the object information 124 as input to the machine learning model 314. The machine learning model 314 may be a multimodal model that can generate an output that predicts or classifies a damageability of the object. The machine learning model 314 may be trained on historical image data, sensor data, and historical object information to generate the output. If the machine learning model 314 classifies or predicts the object as being damageable, the controller 118 may cause a collaborative movement of the object. Additionally or alternatively, if the object has a label 315 designating damageability (e.g., by the machine learning model 314 or as part of the object information 124), the controller 118 may determine that the task is to be performed via a dexterous manipulation rather than a suction grasp. For example, the controller 118 may cause an object labeled as damageable to be "pinched" by two robotic manipulators to lift and move the object to another location. The first robotic manipulator may apply a first force to a first side of the object and the second robotic manipulator may apply a second force to a second side of the object. The first force and the second force, which may be applied in opposite directions, can allow the object to be grasped by both of the robotic manipulators.

The controller 118 may generate a sequence of movements 128 for the one or more robotic manipulators to perform to move the object from the source location to the destination location. If the object is being moved independently, the controller 118 may generate a single sequence of movements for a single robotic manipulator to perform. If the object is being moved collaboratively, the controller 118 can generate a sequence of movements for each robotic manipulator participating in the collaborative movement. The sequence of movements 128 can include moving the one or more robotic manipulators to the source location, causing the robotic manipulators to handle the object into a suitable position for grasping, causing the robotic manipulators to attach to the object (e.g., via suctioning force), moving the robotic manipulators to the destination location, and causing the robotic manipulators to release the object at the destination location. In some examples, the controller 118 may use the machine learning model 314 to generate the sequence of movements 128.

The sequence of movements 128 can include multiple coordinated movements that may each rely upon the success of previous movements. As the controller 118 causes the robotic manipulators to perform the sequence of movements 128, the torque sensors 302 (e.g., positioned on actuators of the robotic manipulators) can transmit sensor data 312 (e.g., force data or torque data) to the controller 118. The sensor data 312 can be feedback that can be used by the controller 118 to determine that a first movement in the sequence of movements 128 has been successfully performed by the robotic manipulators. The controller 118 can cause the robotic manipulators to execute the second movement in the sequence of movements 128 in response to determining that the first movement was successfully performed. In some examples, the controller 118 can also adjust the sequence of movements 128 based at least in part on the sensor data 312. For example, the sensor data 312 may indicate that a weight of the object is higher than the weight indicated by the object information 124. The controller 118 may therefore cause the robotic manipulators to use a suction grasp instead of a force grasp. Or, the object may have originally been manipulated by a single robotic manipulator, but the controller may cause an additional robotic manipulator to collaboratively move the object as well based on the detected weight of the object being higher than a predefined threshold.

Figure 4:
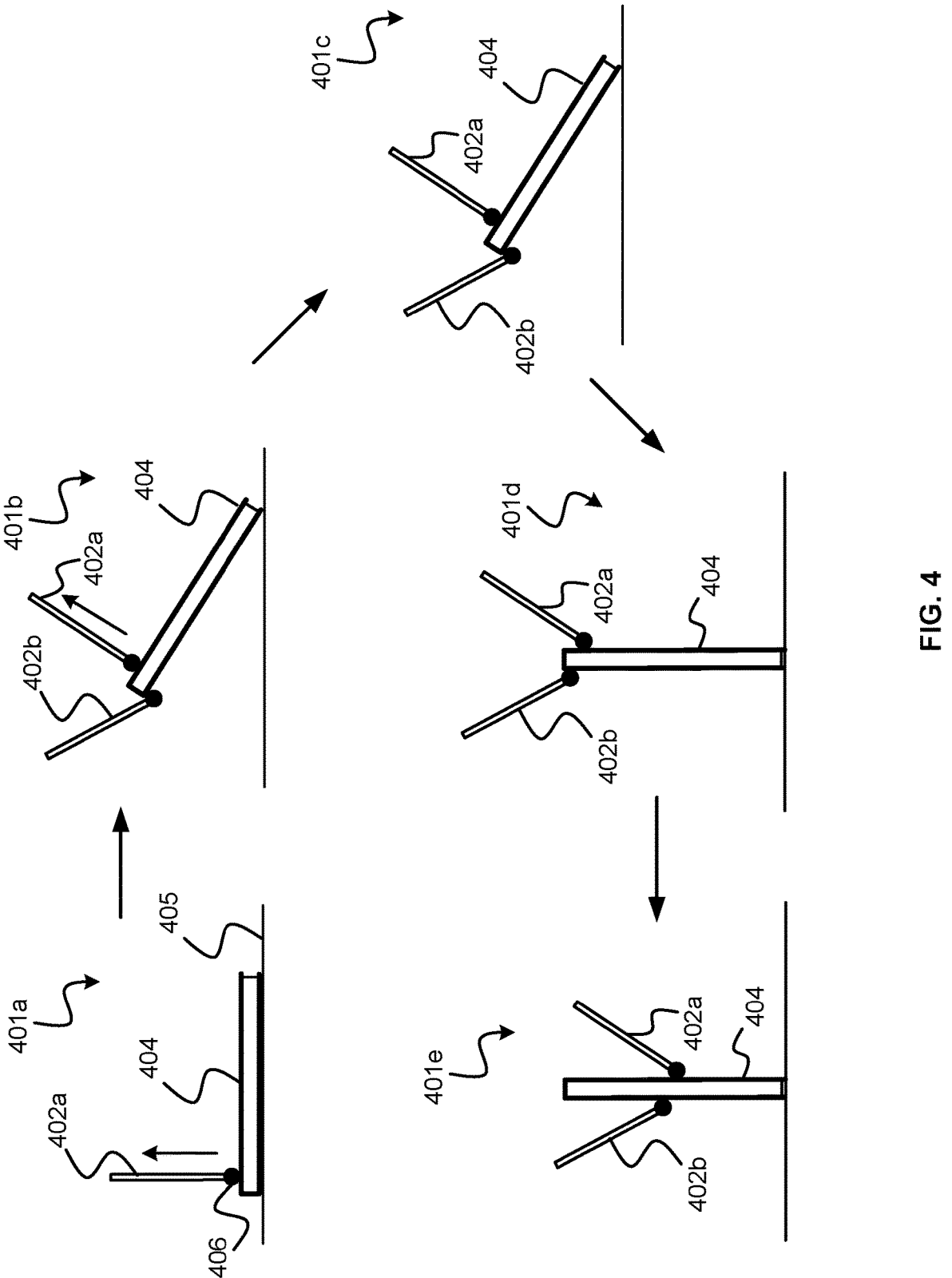
FIG. 4 illustrates an example sequence of movements for robotic arms collaboratively handling a book, according to a particular embodiment.

FIG. 4 illustrates an example sequence of movements 401a-e for robotic arms 402a-b collaboratively handling a book 404, according to a particular embodiment. Some objects, such as the book 404, have additional degrees of freedom beyond a default floating base. Such objects may be responsible for a majority of grasp failures and therefore object damage by robotic manipulators, as the objects may be particularly difficult to pick and place by a single robotic arm. In some examples, common grasp failure from suction grasps may stem from only making contact with a single surface, leaving the other degrees of freedom free to move. In contrast, using multiple robotic arm in collaboration (e.g., according to the sequence of movements generated by the controller 118 of FIGS. 1 and 3) may prevent such grasp failures. In some examples, the sequence of movements may include robotic arm movements that can reorient the book 404 into a position that can enable multiple contact points for the robotic arms. The multiple contact points can allow the robotic arms to move the book 404 more securely to a destination location compared to a single contact point by a single robotic arm.

For example, a book 404 may lay flat on a surface 405 (e.g., a bottom of a container or bin, a conveyer, etc.). A first movement 401a of the sequence of movements can involve a first robotic arm 402a tilting the book 404 with suction. For example, the first robotic arm 402a may include a suction tool 406 that can use suctioning force to attach to the book 404. In particular, the first robotic arm 402a may suction to the spine of the book 404, which may be a relatively stable location. The first robotic arm 402a can tilt the book 404 upwards using the suctioning force.

After the first robotic arm 402a lifts the spine of the book 404 upward, a second robotic arm 402 may perform a second movement 401b. The second movement 401b can involve the second robotic arm 402 supporting the book 404 on an opposite side of the book 404 from the suction grasp of the first robotic arm 402a. That is, the book 404 may rest upon the second robotic arm 402b. A third movement 401c of the sequence of movements can involve the first robotic arm 402a switching from a suction grasp (e.g., via the suction tool 406) to a contact grasp. A fourth movement 401d of the sequence of movements can involve the first robotic arm 402a and the second robotic arm 402b tilting the book 404 to an upright position by tilting each of the robotic arms 402a-b. Finally, a fifth movement 401e of the sequence of movements can involve the first robotic arm 402a and the second robotic arm 402b moving downwards (e.g., to a more stable midway point along the book 404). In some examples, the first robotic arm 402a and/or the second robotic arm 402b can perform a suction grasp onto the book 404 (e.g., the suction tools 406). The first robotic arm 402a and the second robotic arm 402*b* can then move the book 404 to the destination location while maintaining the suction grasp.

Figure 5:
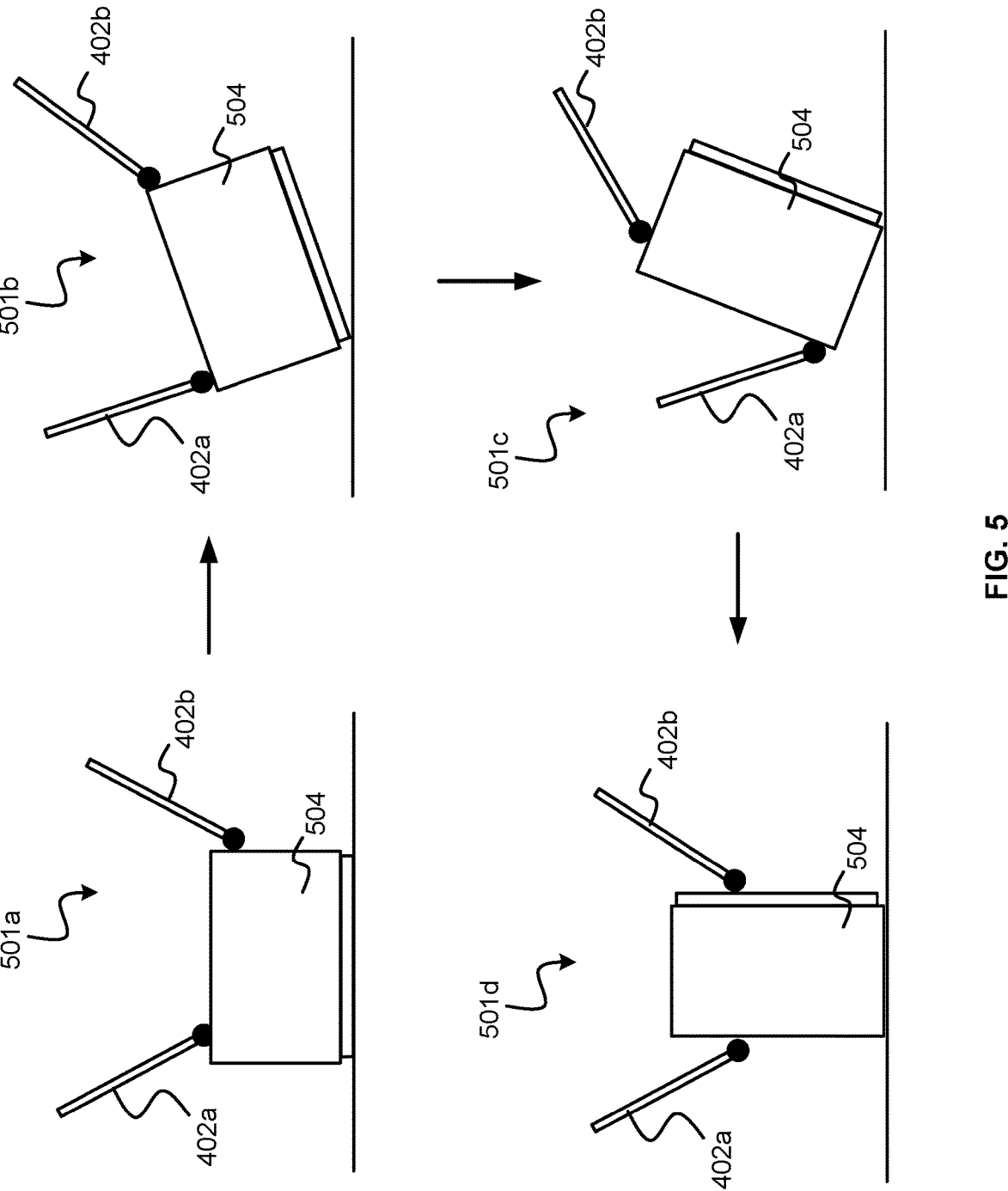
FIG. 5 illustrates another example sequence of movements for robotic arms collaboratively handling a box, according to a particular embodiment.

FIG. 5 illustrates another example sequence of movements 501*a-d* for robotic arm 402*a-b* collaboratively handling a box 504, according to a particular embodiment. The box 504 can be another example of an object that may be difficult for a single robot arm to handle, grasp, or move. The sequence of movements can include a first movement 501*a* in which the first robotic arm 402*a* can be placed on a top of the box 504 and the second robotic arm 402*b* can be placed on a right side of the box 504. The robotic arms 402*a-b* may use contact grasps or suction grasps (e.g., via a suction tool). A second movement 501*b* of the sequence of movements may involve the first robotic arm 402*a* and the second robotic arm 402*b* tilting the right side of the box 504 upwards. The sequence of movements can then include a third movement 501*c* involving the first robotic arm 402*a* and the second robotic arm 402*b* further tilting the box 504 in a leftward direction to place the box 504 onto its left side. Finally, the sequence of movements can include a fourth movement 501*d* involving the first robotic arm 402*a* and the second robotic arm 402*b* grasping (e.g., via a suction tool) the box 504 along a top and bottom of the box 504. The suction grasp that can allow the first robotic arm 402*a* and the second robotic arm 402*b* to securely lift and move the box 504. Grasping the top and bottom of the box 504 (as opposed to grasping the box 504 in an upside-down position) may reduce the risk of the top of the box 504 from opening.

Figure 6:
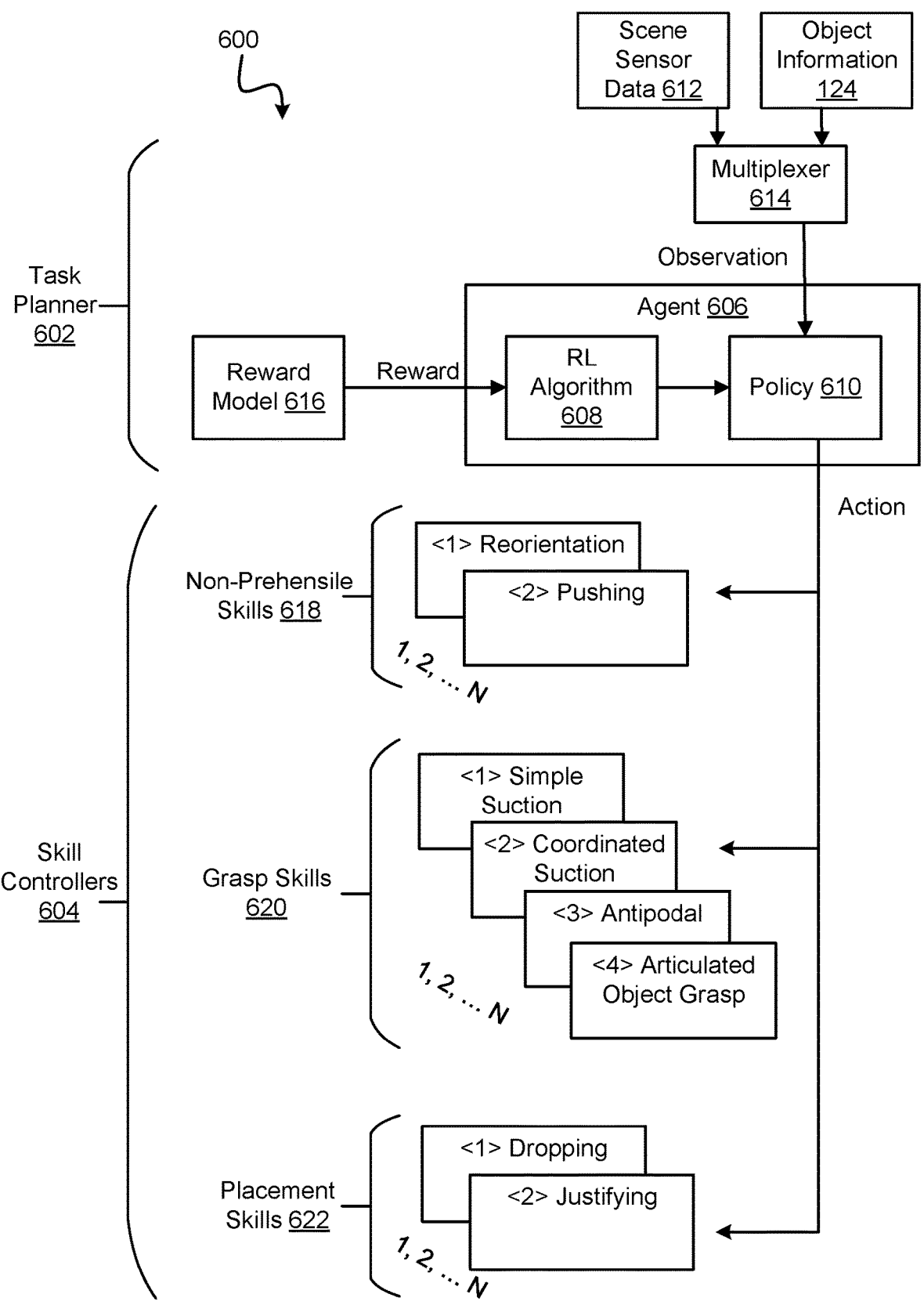
FIG. 6 illustrates a block diagram of an example controller architecture for controlling robotic manipulators to perform independent or collaborative tasks, according to a particular embodiment.

FIG. 6 illustrates a block diagram of an example controller architecture 600 (e.g., for the machine learning model 314 for the controller 118 of FIG. 1) for controlling robotic manipulators to perform independent or collaborative tasks, according to a particular embodiment. The controller architecture 600 can include a task planner 602 and skill controllers 604. Using feedback, the task planner 602 can maximize long-horizon rewards by planning over a set of learned or classical skills (e.g., skill controllers 604). The skill controllers 604 can perceive and act at relatively higher frequencies to accomplish relatively shorter horizon subtasks.

For example, the task planner 602 can include a self-improving agent 606 that can include a deep reinforcement learning (RL) algorithm 608 and learned visuomotor policies 610. Deep RL can be particularly well-suited for task planning based on its ability to maximize long-horizon rewards. In material handling, for example, such a task may involve maximizing final container gross cubic utilization (e.g., the amount of space actually occupied by objects while in storage) by deciding what object to pick next, how to grasp the object, and how and where to place the object. Through metered explorative interactions, the RL algorithm 608 can improve performance of the task planner 602 over time despite partial information or shifting operational distributions.

In an example, the agent 606 can consume observations such as scene sensor data 612 and object information 124. The scene sensor data 612 can include sensor data (e.g., image data 122 or sensor data 312), such as two-dimensional and three-dimensional sensor returns of both source and destination containers. The object information 124 may include semantic object information, such as segment geometry or labels. A multiplexer 614 can combine the scene sensor data 612 and the object information 124 to provide to the agent 606. The agent 606 can use the scene sensor data 612 and the object information 124 to take action to choose which of the non-prehensile skills 618, grasp skills 620, or the placement skills 622 to invoke during the next pick-and-place sequence. Skill controllers 604 can be thought of as learned or hand-built controllers that can perceive and act at relatively high frequencies to accomplish short to medium horizon tasks.

Learned visuomotor policies 610 may be well-suited for many types of skill controllers 604. For example, the agent 606 may use the learned visuomotor policies 610 to generate robust, closed-loop action sequences from visual observations. In some examples, visuomotor policies 610 may be implemented using deep RL, imitation learning, action diffusion, or action transformers. In material handling, for example, a policy 610 may be learned to robustly reorient a diversity of objects from a distribution of initial conditions. In some example, foundation models that are trained on large interaction data sets (or large behavior models) to provide learned visuomotor policies 610 with a "common sense" manipulation backbone. This can enable the task planner 602 to generate sequences of movements that make intuitive sense, such as pushing aside an object that has broken.

The agent 606 can use the observations to generate actions, such as a selection of the non-prehensile skills 618, grasp skills 620, or placement skills 622 to invoke, as well as the entry state and exit state of the skill controllers 604. A step of the RL algorithm 608 can be one full pick-and-place sequence, after which a reward can be generated by a reward model 616. In some examples, the entry states and exit states of the skill controllers 604 (e.g., the actions of the agent 606) can be entered as constraints to a trajectory optimization planner that can generate robotic manipulator trajectories that obey the physical constraints of the robotic manipulator.

Figure 7:
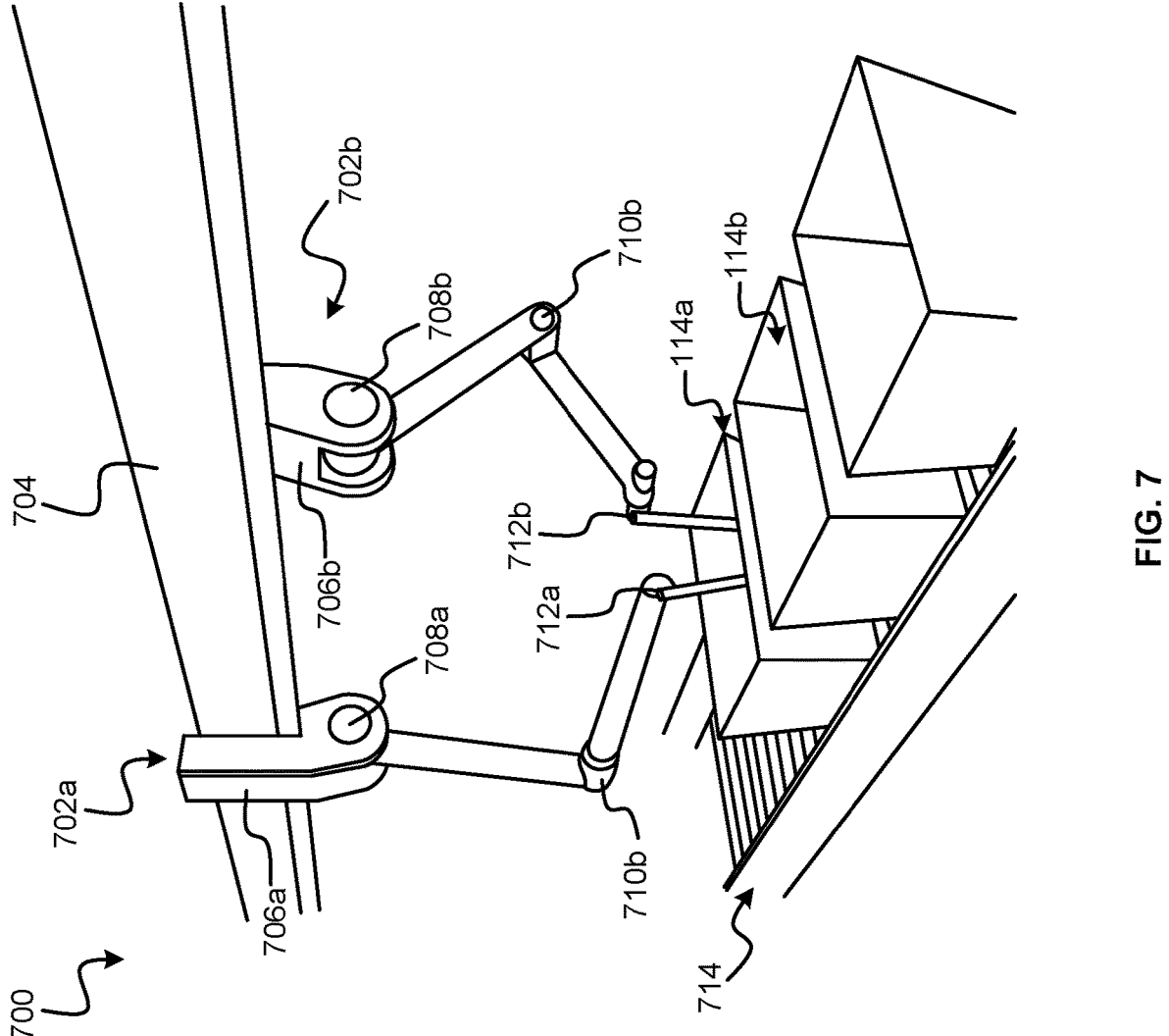
FIG. 7 illustrates another example robot system with two robotic manipulators on a single linear rail performing a collaborative task, according to a particular embodiment.

FIG. 7 illustrates another example robot system 700 with two robotic manipulators 702*a-b* mounted on a single linear rail 704 performing a collaborative task, according to a particular embodiment. The first robotic manipulator 702*a* can be mounted (e.g., mechanically coupled) to the linear rail 704 via a first actuator 706*a*. The first actuator 706*a* can be actuated (e.g., by a controller) to move the first robotic manipulator 702*a* along the linear rail 704. The second robotic manipulator 702*b* can be mounted (e.g., mechanically coupled) to the linear rail 704 via a second actuator 706*b*. The second actuator 706*b* can be actuated (e.g., by a controller) to move the second robotic manipulator 702*b* along the linear rail 704.

The robotic manipulators 702*a-b* can each include first revolute joints 708*a-b*, second revolute joints 710*a-b*, and third revolute joints 712*a-b* that can each be actuated (e.g., by a controller) to perform independent or collaborative tasks. The first robotic manipulator 702*a* may have the same or different type or number of joints and/or actuators than the second robotic manipulator 702*b*. The independent or collaborative tasks may involve manipulating objects, such as handling, moving, grasping, carrying, pinching, reorienting, or pushing an object. For example, the robotic manipulators 702*a-b* may (collaboratively or independently) grasp and move objects between containers 114*a-b* being transported on a conveyer 714.

FIG. 8 illustrates an example flow diagram of a process 800 for robotic arms performing independent tasks and collaborative tasks, according to a particular embodiment. The process 800 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 800 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the controller 118, the controller architecture 600, the client device 1102, the web server 1106, and/or the application server 1108 may perform the process 800 of FIG. 8.

In an example, the process 800 can include operation 802, involving a first robotic arm that is mounted to a first linear rail grasping a first object at a first initial location. In some examples, the first initial location may be a location of the first object on a conveyer that is transporting objects to be stowed (e.g., into containers). The movements and actions performed by the first robotic arm can be controlled by a controller. The controller may cause the first robotic arm to independently grasp the first object as part of performing a task (e.g., moving the first object from the first initial location to a container). That is, the first robotic arm may be the only robotic arm grasping the first object. The controller may cause the first robotic arm to independently grasp the first object because the first object may have a first weight that is lower than a predefined threshold, such as 2 lb. In some examples, the first robotic arm can grasp the first object via an end effector such as a suction tool. In some examples, prior to grasping the first object, the controller can cause the first robotic arm to handle the object (e.g., move the object into a different position or orientation that may be more beneficial for grasping).

In an example, the process 800 can include operation 804, involving moving the first robotic arm along the first linear rail from the first initial location to a container positioned between the first linear rail and a second linear rail. The container can be a destination location for the first object. The first robotic arm can include one or more actuators or joints that can move the robotic arm along the first linear rail. The first robotic arm can continue grasping the first object as the first robotic arm moves along the first linear rail.

In an example, the process 800 can include operation 806, involving the first robotic arm releasing the first object into the container. For example, the first robotic arm may be holding the first object above the container. The controller can cause a first suction tool of the first robotic arm to release a suction force, allowing the first object to fall into the container. Or, the controller may cause the first robotic arm to place the first object into the container before causing the first suction tool to release the suction force. The task of moving the first object to the container can be complete and the controller may then cause the first robotic arm to perform additional tasks. For example, the controller may cause the second robotic arm to move to another initial location for another task.

In an example, the process 800 can include operation 808, involving a second robotic arm mounted to the second linear rail grasping a second object at a second initial location. The second initial location may be another location on the conveyer (e.g., different than the first initial location). The movements and actions performed by the second robotic arm may also be controlled by the controller. The controller may cause the second robotic arm to independently grasp the second object as part of performing a task (e.g., moving the second object from the second initial location to the container). That is, the second robotic arm may be the only robotic arm grasping the second object. The controller may cause the second robotic arm to independently grasp the second object because the second object may have a first weight that is lower than a predefined threshold, such as 2 lb. In some examples, the second robotic arm can grasp the second object via an end effector such as a second suction tool. In some examples, prior to grasping the second object, the controller can cause the second robotic arm to handle the second object (e.g., move the second object into a different position or orientation that may be more beneficial for grasping). In some examples, the controller can cause the second robotic arm to handle or grasp the second object at a same time that the controller can cause the first robotic arm to handle or grasp the first object.

In an example, the process 800 can include operation 810, involving moving the second robotic arm along the second linear rail from the second initial location to the container. The second robotic arm can include one or more actuators or joints that can move the second robotic arm along the second linear rail. The second robotic arm can continue grasping the second object as the second robotic arm moves along the second linear rail. In some examples, the controller can cause the second robotic arm grasping the second object to move along the second linear rail at the same time that the controller causes the first robotic arm grasping the first object to move along the first linear rail. That is, the first robotic arm and second robotic arm may independently perform tasks at the same time.

In an example, the process 800 can include operation 812, involving the second robotic arm releasing the second object into the container. For example, the second robotic arm may be holding the second object above the container. The controller can cause a second suction tool of the second robotic arm to release a suction force, allowing the second object to fall into the container. Or, the controller may cause the second robotic arm to place the second object into the container before causing the second suction tool to release the suction force. The task of moving the second object to the container can be complete and the controller may then cause the second robotic arm to perform additional tasks. For example, the controller may cause the second robotic arm to move to another initial location for another task.

In an example, the process 800 can include operation 814, involving the first robotic arm and the second robotic arm grasping a third object at a third initial location. The third object may have a third weight that is larger than each of a first weight of the first object and a second weight of the second object. The third weight may be larger than the predefined threshold. Because the third weight is larger than the predefined threshold, the controller may cause the first robotic arm and the second robotic arm to collaboratively perform the task of moving the third object to the container.

Thus, the first robotic arm can attach to the third object via the first suction tool and the second robotic arm can attach to the third object via the second suction tool. In some examples, the controller may cause the first robotic arm and the second robotic arm to collaboratively handle the third object at the third initial location prior to grasping the third object or moving the third object between locations. For example, the first robotic arm and the second robotic arm may move the third object into a position that is better suited for grasping the object.

In an example, the process 800 can include operation 816, involving the first robotic arm and the second robotic arm moving, collaboratively, the first robotic arm along the first linear rail to the container and the second robotic arm along the second linear rail to the container. The first robotic arm and the second robotic arm may continue to grasp the third object while moving to the container.

In an example, the process 800 can include operation 818, involving the first robotic arm and the second robotic arm releasing the third object into the container. For example, the first robotic arm and the second robotic arm may hold the third object above the container. The controller can cause the first suction tool of the first robotic arm and the second suction tool of the second robotic arm to release a suction force, allowing the third object to fall into the container. Or, the controller may cause the first robotic arm and the second robotic arm to place the third object into the container before causing the first suction tool and the second suction tool to release the suction force. The task of moving the third object to the container can be complete and the controller may then cause the first robotic arm and the second robotic arm to perform additional tasks. For example, the controller may cause the first robotic arm or the second robotic arm to move to another initial location for another task. The additional tasks may be independently or collaboratively performed.

FIG. 9 illustrates an example flow diagram of a process 900 for determining a collaborative task or an independent task for robotic arms, according to a particular embodiment. The process 900 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 900 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the controller 118, the controller architecture 600, the client device 1102, the web server 1106, and/or the application server 1108 may perform the process 900 of FIG. 9.

In an example, the process 900 can include operation 902, involving identifying an object identifier for an object. For example, a controller can receive scene sensor data of a robot station at which objects are sorted into containers. The scene sensor data can include image data of the object (e.g., captured by an optical sensor at the robot station). The scene sensor data can be two-dimensional data or three-dimensional data. The controller can perform scene understanding or computer vision techniques on the scene sensor data to associate the object with the object identifier.

In an example, the process 900 can include operation 904, involving accessing object information for the object based on the object identifier. For example, the object identifier may be mapped to object information for the object in a data store. The controller can access the object information and, in some examples, location information for the object. The location information can include a source location for the object and a destination location for the object. The controller can determine a task associated with manipulating the object for one or more robotic arms to perform. For example, the task may involve moving the object from the source location to the destination location.

In an example, the process 900 can include operation 906, involving determining whether the object information necessitates collaboration of the robotic manipulators. For example, objects with weights that are lower than the predefined threshold can be safely (e.g., with relatively low risk of failure) be handled, grasped, moved, and placed by a single robotic arm. It may be beneficial to handle, grasp, move, or place objects with weights that are higher than the predefined threshold with multiple robotic arms. If the weight of the object is higher than the predefined threshold, the process 900 can continue to operation 908. If the weight of the object is lower than the predefined threshold, the process 900 can continue to operation 910.

Additionally or alternatively, the controller may use other criteria to determine whether the process continues to operation 908 or operation 910. For example, the process 900 may continue to operation 908 if the object information indicates that one or more dimensions (e.g., length, width, height) of the object is greater than a predefined threshold or if a label indicates that the object is irregularly shaped or fragile. In some examples, the controller may input the object information, location information, sensor data, image data, or any other relevant data into a machine learning model that generate an output predicting a damageability of the object. If the machine learning model predicts or generates a label classifying the object as damageable, the process 900 may continue to operation 908. If the machine learning model does not predict or classify the object as damageable, the process 900 may continue to operation 910.

In an example, the process 900 can include operation 908, involving causing a collaborative task performance by two or more robotic arms. The controller can cause two or more robotic arms to handle, grasp, move, and place the object. For example, a first robotic arm and a second robotic arm can each use suction tools to attach to the object. The first robotic arm and the second robotic arm can then move along one or more linear rails, while each grasping the object, to reach a destination location for the object. The first robotic arm and the second robotic arm can then release the object into the container. It may be difficult or impossible for either the first robotic arm or the second robotic arm to independently move the object to the container. But the first robotic arm and the second robotic arm may be capable of collaboratively moving the object to the container.

In an example, the process 900 can include operation 910, involving causing a single robotic arm to perform an independent task. For example, a single, first robotic arm can attach to the object (e.g., via a suction tool), lift the object, move to a container, and release the object into the container. The first robotic arm may produce enough suction force to lift and move the object without failure. As the first robotic arm is independently performing the task to move the object to the container, a second robotic arm can simultaneously and independently perform a different task to move another object.

FIG. 10 illustrates an example flow diagram of a process 1000 for causing robotic arms to perform a sequence of movements, according to a particular embodiment. The process 1000 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 1000 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the controller 118, the controller architecture 600, the client device 1102, the web server 1106, and/or the application server 1108 may perform the process 1000 of FIG. 10.

In an example, the process 1000 can include operation 1002, involving generating a sequence of movements for a first robotic arm and a second robotic arm to collaboratively move an object to a container. In some examples, a controller can generate the sequence of movements by determining a position and orientation (e.g., joint orientation) of the first robotic arm and the second robotic arm from sensor data. The sensor data may include torque data, pressure data, image data, or any other kind of sensor data detected at or near the robotic arms. The sequence of movements can start with the positions and orientations of the robotic arms.

In an example, the process 1000 can include operation 1004, involving causing the first robotic arm and the second robotic arm to perform a first movement of the sequence of movements. For example, the controller can cause the first robotic arm and the second robotic arm to perform the first movement of moving to a source location for the object (e.g., the current location of the object). The controller may cause the first robotic arm to make a first movement along a first linear rail to the source location. The controller may cause the second robotic arm to make the first movement along a second linear rail (e.g., a same or different linear rail as the first linear rail) to the source location.

In an example, the process 1000 can include operation 1006, involving receiving torque data for the first robotic arm and the second robotic arm. The torque data can be collected by torque sensors that are positioned on actuators, joints, or other components of the robotic arms. The controller can receive the torque data as well as any other sensor data, such as image data depicting the robotic arms.

In an example, the process 1000 can include operation 1008, involving determining that the first movement has been successfully performed based on the torque data. For example, the torque data may indicate that actuators have been used to move the first robotic arm and the second robotic arm to the source location. The controller may also use other sensor data, such as image data, to confirm that the first robotic arm and the second robotic arm have completed the first movement of moving to the source location. In some examples, the movements of the first robotic arm and the second robotic arm can be synchronized, such as to within a range of 10 milliseconds to 20 milliseconds to one another. For example, if the first movement involves the first robotic arm and the second robotic arm collaboratively tilting a book, the first robotic arm and the second robotic arm may have a latency in performing the first movement that is less than 10 milliseconds to ensure that the first movement can be successfully performed.

In an example, the process 1000 can include operation 1010, involving causing the first robotic arm and the second robotic arm to perform a second movement of the sequence of movements in response to determining that the first movement has been successfully performed. For example, a second movement may involve moving the first robotic arm and the second robotic arm to contact the object at the source location. The controller may similarly confirm, via sensor data, that subsequent movements (such as the second movement) have been successfully performed before causing the robotic arms to perform the next movement in the sequence of movements. Example subsequent movements can include causing the robotic arms to apply suction force to the object to grasp the object, causing the robotic arms to lift the object, causing the robotic arms to move along the linear rails to the destination location for the object, causing the robotic arms to release the suction force to place the object, or any suitable movement or action that can be performed by the robotic arms to manipulate objects.

Figure 11:
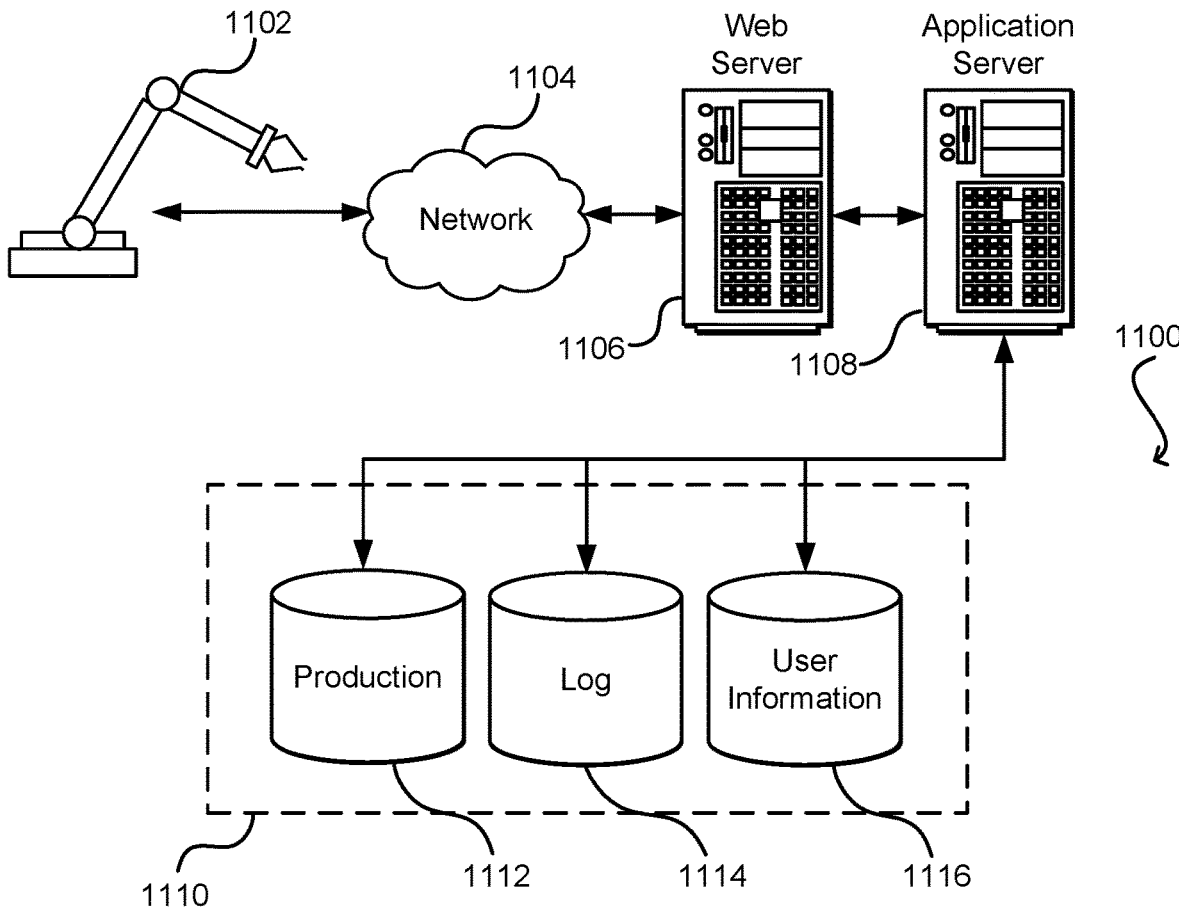
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, such as a robotic controller, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. Components of the client device 1102 can include some or all components of the components of the controller 118. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:

grasping, by a first robotic arm mounted to a first linear rail, a first object at a first initial location;

moving the first robotic arm along the first linear rail from the first initial location to a container positioned between the first linear rail and a second linear rail;

releasing, by the first robotic arm, the first object into the container;

grasping, by a second robotic arm mounted to the second linear rail, a second object at a second initial location;

moving the second robotic arm along the second linear rail from the second initial location to the container;

releasing, by the second robotic arm, the second object into the container;

grasping, by the first robotic arm and the second robotic arm, a third object at a third initial location, wherein the third object has a third weight that is larger than each of a first weight of the first object and a second weight of the second object, wherein the first robotic arm and the second robotic arm grasp the third object by at least being controlled by a controller, wherein the controller is configured to access, from a data store, object information associated with the third object based at least in part on identifying, from image data representing the third object, an object identifier for the third object, wherein the controller is further configured to control the first robotic arm and the second robotic arm to collaboratively grasp and move the third object based at least in part on the object information;

moving, collaboratively and by at least being controlled by the controller, the first robotic arm along the first linear rail to the container and the second robotic arm along the second linear rail to the container; and releasing, by the first robotic arm and the second robotic arm, the third object into the container.

2. The method of claim 1, wherein the first robotic arm includes a first suction tool and the second robotic arm includes a second suction tool, wherein the first object is grasped and moved by the first suction tool of the first robotic arm at a same time that the second object is grasped and moved by the second suction tool of the second robotic arm, and wherein the third object is grasped and moved by the first suction tool and the second suction tool at a same time.

3. The method of claim 1, further comprising:

determining, by the controller of the first robotic arm and the second robotic arm, that the third weight of the third object exceeds a predefined weight threshold; and causing, by the controller, the first robotic arm and the second robotic arm to grasp, at a same time, the third object in response to determining that the third weight of the third object is above the predefined weight threshold.

4. The method of claim 1, further comprising:

determining, by the controller of the first robotic arm and the second robotic arm, that the third object is to be grasped by the first robotic arm and the second robotic arm based at least in part on a dimension of the third object or a shape of the third object; and causing, by the controller, the first robotic arm and the second robotic arm to grasp, at a same time, the third object in response to determining that the third object is to be grasped by the first robotic arm and the second robotic arm.

5. A robotic system comprising:

a set of linear rails;

a first robotic manipulator mechanically coupled to a first linear rail of the set of linear rails and configured to move, along the first linear rail, a first object between first locations;

a second robotic manipulator mechanically coupled to a second linear rail of the set of linear rails and configured to move, along the second linear rail, a second object between second locations, the second linear rail being the same or different from the first linear rail, wherein the first robotic manipulator and the second robotic manipulator are configured to collaboratively move, along the first linear rail and the second linear rail, a third object between third locations;

an optical sensor configured to capture image data representing the third object; and a controller configured to:

access, from a data store, object information associated with the third object by at least identifying, based on the image data from the optical sensor, an object identifier for the third object; and cause the first robotic manipulator and the second robotic manipulator to collaboratively move the third object between the third locations based at least in part on the object information.

6. The robotic system of claim 5, wherein the first robotic manipulator and the second robotic manipulator are configured to collaboratively handle the third object at a source location prior to collaboratively moving the third object between third locations.

7. The robotic system of claim 5, wherein the controller is further configured to control the first robotic manipulator and the second robotic manipulator such that the first robotic manipulator moves the first object independently of the second robotic manipulator, the second robotic manipulator moves the second object independently of the first robotic manipulator, or the first robotic manipulator and the second robotic manipulator collaboratively move the third object.

8. The robotic system of claim 7, wherein the controller is further configured to:

access, based at least in part on the object identifier and from the data store, the object information associated with the third object and indicating at least one of a weight, a dimension, or a shape of the third object;

access, based at least in part on the object identifier and from the data store, location information indicating a source location and a destination location; and cause, based at least in part on the object information, the first robotic manipulator and the second robotic manipulator to move to the source location, collaboratively handle the third object at the source location, and collaboratively move the third object from the source location to the destination location.

9. The robotic system of claim 8, wherein the controller is further configured to cause the first robotic manipulator and the second robotic manipulator to collaboratively handle the third object at the source location and collaboratively move the third object between third locations based at least in part on determining that the dimension or the weight of the third object exceeds a predefined threshold.

10. The robotic system of claim 7, wherein the controller is further configured to cause the first robotic manipulator and the second robotic manipulator to collaboratively move the third object between third locations by at least generating a first sequence of movements for the first robotic manipulator and a second sequence of movements for the second robotic manipulator that are usable to collaboratively move the third object between the third locations.

11. The robotic system of claim 8, wherein the controller is further configured to cause the first robotic manipulator and the second robotic manipulator to collaboratively move the third object between the third locations by at least:
determining a label classifying the third object, the label generated using a machine learning model based at least in part on one or more of the object information, the location information, sensor data, or image data representing the third object.

12. The robotic system of claim 5, wherein the first robotic manipulator and the second robotic manipulator are configured to collaboratively move the third object between third locations by the first robotic manipulator applying a first force to the third object and the second robotic manipulator applying a second force to the third object.

13. The robotic system of claim 5, further comprising:
a first sensor coupled to a first actuator of the first robotic manipulator, the first sensor configured to detect first data for the first actuator and transmit the first data to the controller of the first robotic manipulator and the second robotic manipulator; and
a second sensor coupled to a second actuator of the second robotic manipulator, the second sensor configured to detect second data for the second actuator and transmit the second data to the controller.

14. The robotic system of claim 13, wherein the controller is configured to cause the first robotic manipulator and the second robotic manipulator to collaboratively move the third object between third positions by at least:
receiving the first data and the second data;
determining, based at least in part on the first data and the second data, that a first movement in a sequence of movements for the first robotic manipulator and the second robotic manipulator has been successfully performed; and
causing the first robotic manipulator or the second robotic manipulator to perform a second movement in the sequence of movements in response to determining that the first movement has been successfully performed.

15. The robotic system of claim 5, wherein the first robotic manipulator or the second robotic manipulator have four degrees of freedom of movement.

16. The robotic system of claim 5, wherein the object information comprises a type of item that is associated with a collaborative transfer operation.

17. A robotic manipulator, comprising:
a first end mechanically coupled to a first linear rail of a set of linear rails;
an actuator coupled to the first end and configured to move the robotic manipulator along the first linear rail; and
a second end configured to move a first object between first locations, wherein the second end is further configured to move a second object between second locations in collaboration with another robotic manipulator mechanically coupled to and movable along a second linear rail of the set of linear rails, the second linear rail being the same or different from the first linear rail,
wherein the robotic manipulator and the other robotic manipulator are configured to be controlled to collaboratively move the second object by a controller, and wherein the controller is configured to:
access, from a data store, object information associated with the second object by at least identifying, from image data representing the second object received from an optical sensor, an object identifier for the second object; and
cause the robotic manipulator and the other robotic manipulator to collaboratively move the second object between second locations based at least in part on the object information.

18. The robotic manipulator of claim 17, wherein the second end further comprises a first suction tool configured to couple to the first object or the second object, and wherein the other robotic manipulator further comprises a second suction tool configured to couple to the second object.

19. The robotic manipulator of claim 17, further comprising:
an arm comprising the first end and the second end, wherein the actuator is configured to move the arm along the first linear rail in a first direction, and wherein the arm further comprises:
a first joint configured to rotate the arm in a first rotational direction;
a second joint configured to rotate the arm in a second rotational direction that is different than the first rotational direction; and
a third joint configured to extend the arm in a second direction that is different than the first direction.

20. The robotic manipulator of claim 17, wherein the controller is further configured to receive sensor data from one or more sensors coupled to the robotic manipulator and to adjust a sequence of movements for collaboratively moving the second object between second locations based at least in part on the sensor data.

* * * * *